United States Patent [19]

Hennig et al.

[11] Patent Number: 4,771,906
[45] Date of Patent: Sep. 20, 1988

[54] TELESCOPIC COVER

[75] Inventors: Kurt Hennig, Munich; Albert Stöhr, Markt Schwaben, both of Fed. Rep. of Germany

[73] Assignee: Gebr. Hennig GmbH, Ismaning, Fed. Rep. of Germany

[21] Appl. No.: 869,229

[22] Filed: Jun. 2, 1986

[30] Foreign Application Priority Data

Jun. 26, 1985 [DE] Fed. Rep. of Germany ....... 3522884

[51] Int. Cl.⁴ .......................... B65D 6/16; B65D 8/14
[52] U.S. Cl. ...................................................... 220/8
[58] Field of Search ..................................... 220/8, 80

[56] References Cited

U.S. PATENT DOCUMENTS

| | | | |
|---|---|---|---|
| 2,956,705 | 10/1960 | Clingman | 220/80 |
| 2,990,970 | 7/1961 | Murdock | 220/8 |
| 3,024,939 | 3/1962 | Kantor | 220/80 |
| 3,266,656 | 8/1966 | Kridle | 220/80 |
| 3,436,928 | 4/1969 | Swerbinsky | 220/8 |
| 3,691,671 | 9/1972 | Kroll | 220/8 |

FOREIGN PATENT DOCUMENTS

| | | | |
|---|---|---|---|
| 1564620 | 4/1969 | France | 220/8 |
| 103286 | 12/1941 | Sweden | 220/8 |

*Primary Examiner*—George E. Lowrance
*Attorney, Agent, or Firm*—Thomas & Kennedy

[57] ABSTRACT

The invention relates to a telescopic cover (1) in which the individual cover boxes (2, 2', 2") comprise a top wall (3, 3', 3"), two side walls and a rear wall (4, 4', 4") and the extending movement of the cover boxes is limited by a stop (11). At least for connection of the rear wall (4) to the top wall (3) an elongated profile (9) is provided which has parallel flanges (11, 12) on one broad side between which the top wall is retained and of which the outer flange (11) at the same time forms the said stop, whilst the inner flange (12) at the same time forms an assembly stop for the rear wall (4). This results in a particularly quick and precise assembly of the individual cover boxes.

8 Claims, 3 Drawing Sheets

TELESCOPIC COVER

FIELD OF THE INVENTION

The present invention relates generally to machinery covers and particularly to telescoping covers for protecting machine tool guideways.

BACKGROUND OF THE INVENTION

Until now the production of the cover box for a telescopic cover used to cover and protect a machine tool guideway has been very complicated. First of all outlines have to be made (so-called tracing) on the blank which is to form the top wall and the side walls in order to mark the stamping and bending lines. After the stamping operation (production of cut-outs) comes the longitudinal bending of the angles which later serve for connection to the rear wall. Then the flanks are bent. In order for the basic body which has been prepared in this way to be connected to the rear wall, both parts must then be clamped true to size before the welding or riveting can be carried out.

SUMMARY OF THE INVENTION

The object of the invention is to construct a telescopic cover which includes a plurality of cover boxes which can be pushed telescopically into one another.

A characteristic of the telescopic cover according to the invention is the use of a connecting profile which ensures a tongue-and-groove joint between the top wall and the rear wall (and possibly also between the two side walls and the real wall). The connecting profile results in a saving of the costly operations of producing cut-outs and bends for connection purposes which was necessary in the past. The tongue-and-groove joint which is achieved by the connecting profile also ensures a very simple assembly of the top wall (or side walls) with the rear wall at the correct angle. The connecting profile ensures that these parts are positioned at the correct angle relative to one another particularly during the welding operation.

Since the outer flange of the connecting profile at the same time forms the stop for the entrainment of the next larger cover box, special adjustment of the rear wall (relative to the top wall) is no longer necessary in order to form this stop.

In the telescopic cover according to the invention the next larger cover box lies in each case on a smooth drawn profile which produces good sliding conditions. If required, recesses can be provided in this drawn connecting profile as discharge channels or stripping units.

BRIEF DESCRIPTION OF THE DRAWINGS

Advantageous embodiments of the invention are the subject matter of the claims and are described in connection with the explanation of two embodiments which are illustrated in the drawings, in which:

DETAILED DESCRIPTION

Figure 1:
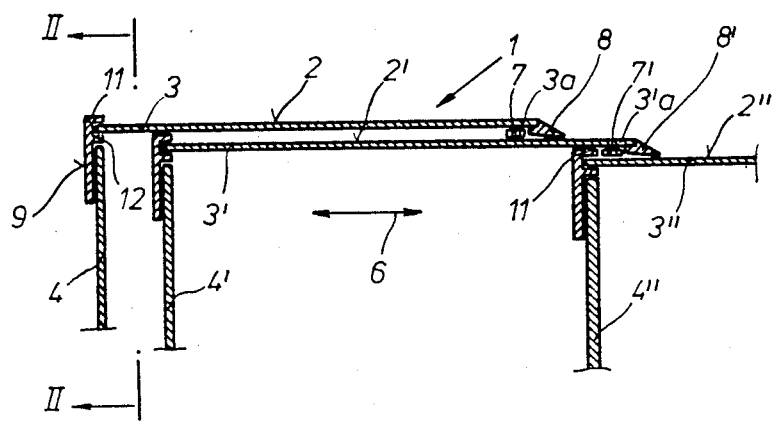
FIG. 1 shows a partial longitudinal section through a telescopic cover according to the invention.

Of the whole telescopic cover only three cover boxes 2, 2', 2" are illustrated in FIG. 1, and these cover boxes are all essentially of similar construction as regards their shape but of different cross-section in such a way that all the cover boxes 2, 2', 2" can be pushed into one another and extended in a telescopic manner; in FIG. 1 the right-hand cover box 2" is located in its outermost extended position relative to the central cover box 2', whilst this central cover box 2' is almost completely pushed into the left-hand cover box 2.

Figure 2:
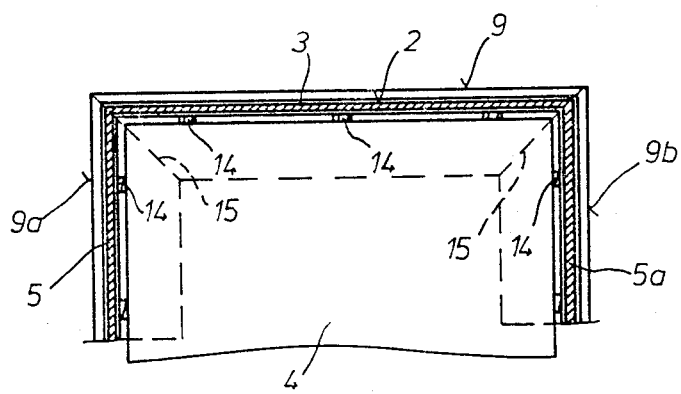
FIG. 2 shows a section along the line II—II in FIG. 1.

Each cover box 2, 2', 2" comprises a top wall 3, 3', 3" respectively, a rear wall 4, 4', 4" respectively and—cf. FIG. 2—two side walls 5, 5a. When the cover boxes 2, 2', 2" are telescoped into one another, the rear wall 4, 4', 4" respectively of the next larger cover box 2, 2' or the corresponding rear wall region at the same time forms a stop for the cover boxes 2', 2" which lie one inside the other. For the drawing out of the cover boxes 2, 2', 2" as indicated by the double arrow 6, a first locating stop 7, 7' is mounted on the front end 3a, 3'a of the relevant top wall, on the underside thereof opposite the rear wall 4, 4', this first locating stop corresponding approximately in thickness to the clear distance between two adjacent top walls 3 and 3' which lie one above the other, and coming into engagement during the extending movement of the cover boxes 2', 2" with a second locating stop which is explained in greater detail below and serves to entrain the next larger cover box 2' or 2" respectively, as illustrated in the right-hand part of FIG. 1.

A stripping edge 8 or 8' respectively which is constructed and arranged in the conventional manner is mounted on the front end 3a, 3'a of the top wall 3 or 3" immediately in the region before each first locating stop 7,7', rests on the upper surface of the next lower top wall 3' or 3" respectively so as to form a seal and is of elastic construction at least at its front end. As is known per se, similar stripping edges can also be arranged in the region of the side walls which lie one above another.

It should also be noted at this point that the top walls 3, 3', 3"... and the side walls 5, 5a of all cover boxes 2, 2', 2"... generally run approximately parallel to the upper surface or the side surface of the machine tool guideway—not illustrated—which is to be protected, and the cover boxes 2, 2', 2"... can be supported for example by their rear walls 4, 4', 4"... so as to be slidable on the upper surface of the guideway.

It is of particular importance that for connection of the rear wall 4, 4', 4" to the appertaining top wall 3, 3', 3" on the one hand and for connection of this rear wall to the appertaining side walls 5, 5a on the other hand three elongated profiles (connecting profiles) 9, 9a, 9b are provided for each cover box 2, 2', 2"... (cf. also FIG. 2).

Such an elongated connecting profile will be explained in greater detail below with the aid of FIGS. 3 and 4. This connecting profile 9 has on one of its broad sides 10'one of its inner sides with respect to the appertaining cover box—in the proximity of the upper long edge thereof two parallel flanges 11, 12 which run parallel in the longitudinal direction of this profile 9 and have a clear distance a between them which is only slightly greater than the thickness of the appertaining top wall (e.g. 3) so that this top wall can be inserted into the groove 13 formed by the two parallel flanges 11 and 12 and can be retained approximately at right angles to the broad side 10 of the profile by these two flanges 11, 12 (in this connection cf. also the illustration in FIG. 1).

Of these parallel flanges 11 and 12 of the connecting profile 9 the upper outer flange 11 at the same time forms the stop for the entrainment of the next larger cover box. For the explanation of the telescopic cover 1 according to FIG. 1 this means therefore that this upper flange 11 at the same time forms the second locating stop which comes into engagement with the first locating stop 7, 7' of the next larger cover box during the extending movement of the cover boxes 2, 2', 2" and thereby defines the greatest extended length of two cover boxes (e.g. 2', 2") lying one inside the other.

Figure 4:
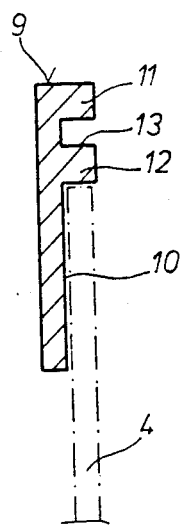
FIG. 4 shows a cross-section through the connecting profile along the line IV—IV in FIG. 3.

With this construction of the elongated connecting profile 9, during assembly the inner flange 12 also forms a stop for the rear wall 4 of the appertaining cover box 2 which lies flat on the inner broad side 10, as is illustrated in FIG. 4 by the dot-dash lines indicating the rear wall 4.

Figure 3:
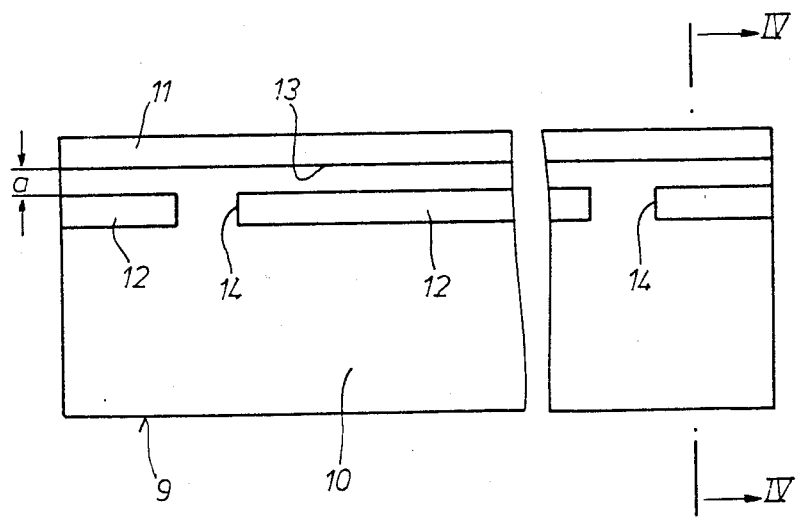
FIG. 3 shows an enlarged view of an elongated connecting profile.

Furthermore, it is advantageous if the inner flange 12 of the connecting profile 9 has openings in it at intervals—as illustrated in FIGS. 2 and 3—in such a way that chambers 14 are formed by these openings for common welding of the connecting profile 9 to the rear wall and the top wall.

All elongated connecting profiles 9, 9a, 9b can have the same cross-section and can be constructed as a drawn profile with integral flanges, so that the production of these connecting profiles is particularly simple. The construction of these connecting profiles 9, 9a, 9b as drawn profiles also has the particular advantage that these relatively flat profiles which are made for example from steel have excellent sliding properties which are particularly favourable for the telescopic pushing together and drawing apart of the cover boxes.

As has already been mentioned, all connecting profiles 9, 9a, 9b can have the same profile cross-section, and the rear wall (e.g. 4) can be connected not only to the appertaining top wall (e.g. 3) but also to the two appertaining side walls 5, 5a by means of the two additional elongated connecting profiles 9a, 9b in the same way as was described above (cf. FIG. 2); thus the laterally arranged connecting profiles 9a, 9b differ only in length from the upper connecting profile 9 (for the top wall).

For the assembly of a cover box (e.g. 2) it is particularly advantageous if the three appertaining connecting profiles 9, 9a, 9b together form a connecting profile frame which is open on one side (downwards), as indicated by broken lines in FIG. 2. The two ends which lie opposite one another of any two adjacent connecting profiles 9a and 9 or 9 and 9b are mitred (cf miter lines 15) and assembled at right angles to one another (fixed together if necessary by several welds). The top wall 3 and the two side walls 5, 5a can then be arranged in the predetermined position in the appertaining groove 13 between the parallel flanges 11 and 12 in the manner described above, and also the rear wall 4 is placed flat on the broad side 10 of the profiles 9, 9a, 9b (as far as the stop formed by the inner flanges 12) in the manner described with the aid of FIG. 4. This loose assembly of the said parts can be produced quickly and easily and represents the exact assembly position so that the parts can be welded together at the same time in one welding operation, above all since the welding together can be carried out section by section in the welding chambers 14 described above.

Figure 5:
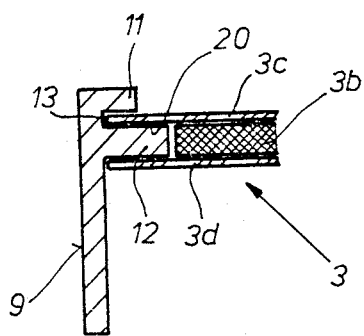
FIG. 5 shows a section through a further embodiment of the invention.
Figure 6:
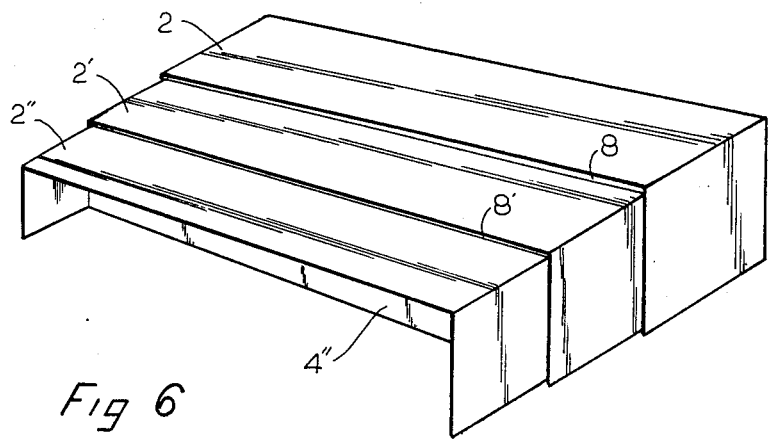
FIG. 6 shows a perspective view of a telescopic cover according to the invention.
Figure 7:
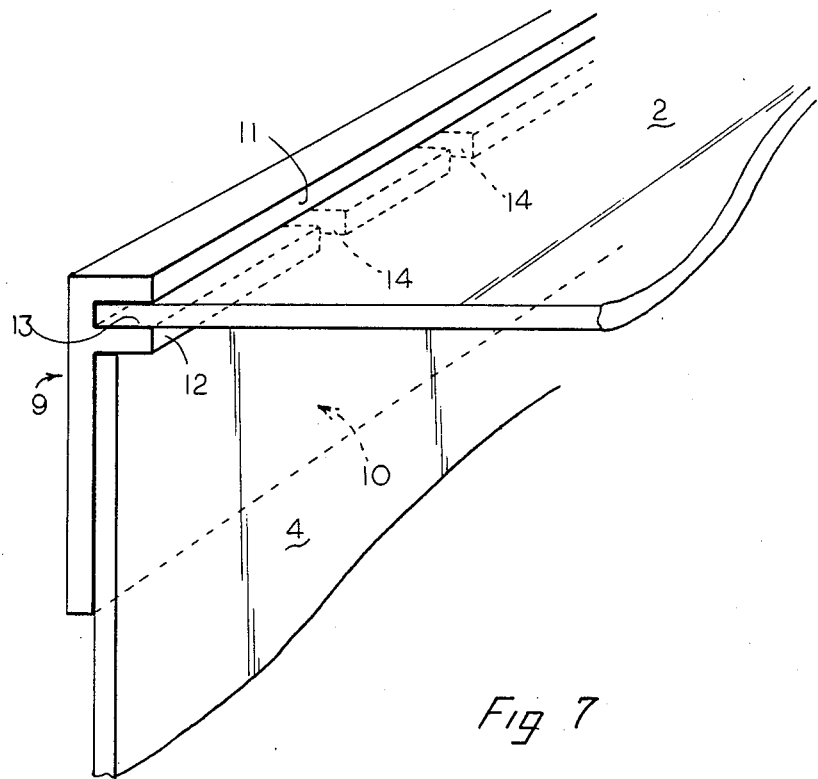
FIG. 7 is a perspective view partially in section showing the connecting profile 9 and the connection of the rear wall 4 and the cover 2.

FIG. 5 shows a further embodiment of the invention. The top wall 3 is produced from a compound material which contains a core 3b which is preferably made from plastics material and two coating layers 3c and 3d which are preferably metallic. The edge of the top wall facing the connecting profile 9 is provided with a groove 20 the breadth of which corresponds to the thickness of the core 3b in the illustrated embodiment.

The dimensions of the groove 20 also corresponds to the dimensions of the inner or lower flange 12 of the connecting profile 9. The groove 13 between the flanges 11 and 12 of the connecting profile 9 is narrower in this embodiment than in the variant according to FIG. 4; the thickness of the groove 13 corresponds approximately to the thickness of the coating layer 3c.

In the embodiment according to FIG. 5 the tongue-and-groove joint between the top wall 3 and the connecting profile 9 is produced by pushing the top wall 3 with its groove 20 so as to lock positively onto the flange 12 of the connecting profile 9. The outer flange 11 ensures additional stabilisation.

We claim:

1. A telescopic cover assembly comprising a plurality of similarly oriented cover boxes telescopically movable with respect to each other, each of said cover boxes having a top wall, a back wall and two side walls;

means for connecting said top wall to said back wall comprising a connecting profile (9) having a generally flat elongated strip (10) with a first and second side and a first and second longitudinally extending flange (11 and 12) protruding from said first side, and first flange being disposed along an edge of said first side and said second flange being in spaced parallel relationship with respect to said first flange, said first and second flanges defining a groove (13) therebetween for accepting an edge of said top wall of said cover box;

said connecting profile being adapted to accept said back wall in side abutment with said first side of said elongated strip and in end abutment with said second longitudinally extending flange so that said top wall and said back wall, when connected together via said connecting profile, are oriented in a predetermined angular relationship with respect to each other and said first flange overlays said top wall;

said side walls being connected to the common edges of said top and back walls to form a generally rectangular open cover box.

2. A telescopic cover assembly as claimed in claim 1 wherein the spacing of said first and second flanges is such that said groove is sufficiently wider than the thickness of said top wall to present a snug fit for said top wall within said groove.

3. A telescopic cover assembly as claimed in claim 1 wherein said top wall is formed from a multi-layer laminate having an inner core (3b) and first and second outer surfaces (3c and 3d), said inner core having a thickness substantially corresponding to the width of said second flange, said outer surfaces extending beyond said inner core along one edge of said top wall to define a channel (20) having a width substantially corresponding to the width of said second flange for receiving said second flange and wherein said groove defined by said first and second flanges has a width generally corresponding to the thickness of said first outer surface for receiving said first outer surface so that when said second flange is placed in said channel, said first outer surface rests firmly within said groove defined by said first and second flanges.

4. A telescopic cover assembly as claimed in claim 1 further comprising means for connecting each of said side walls to said back wall comprising a connecting profile having a generally flat elongated strip with a first and second side and a first and second longitudinally extending flange protruding from said first side, said first flange being disposed along an edge of said first side and said second flange being in spaced parallel relationship with respect to said first flange, said first and second flanges defining a groove (13) therebetween for accepting an edge of said back wall of said cover box, said connecting profile being adapted to accept said side wall in side abutment with said first side of said elongated strip and end abutment with said second longitudinally extending flange so that said back wall and said side wall when connected together via said connecting profile are orineted in a predeterimined angular relationship with respect to each other and said first flange extends beyond said side wall.

5. A telescopic cover as claimed in claim 4 wherein said connecting profile for connecting said top and back walls and said connecting profiles for connecting said side and back walls are mitered at predetermined angles and connected together.

6. A telescopic cover as claimed in claim 5 wherein said second flange has weld chambers (14) formed therein at predetermined intervals.

7. A telescopic cover as claimed in claim 5 wherein said first and second flanges are integrally formed with said elongated strip.

8. A telescopic cover assembly comprising a series of cover boxes telescopically movable with respect to each other with each box including a top wall and with side walls and a rear wall extending downwardly from said top wall and a stop for limiting the extending movement of an inner box from within an outer box, the improvement therein comprising an elongated connecting profile (9) for connecting the rear wall (4) to the top wall (3), said connecting profile including a flat elongated strip with elongated parallel spaced flanges (11, 12) extending at a right angle from said strip with one flange (11) extending along one elongate edge of the strip and the second flange spaced from said first flange and forming a slot (13) of a width approximately equal to the thickness of said top wall, an edge portion of said top wall being inserted into said slot and an edge portion of said back wall being positioned in side abutment with said strip and in end abutment with said second flange to orient said top wall and back wall at a right angle, said second flange being interrupted along its length to form a plurality of weld chambers (14) therein, and said top wall, back wall and strip being welded together at said weld chambers.

* * * * *